C. T. EVANS.
WELDING CONTROLLER.
APPLICATION FILED MAY 6, 1915.
1,215,921. Patented Feb. 13, 1917.
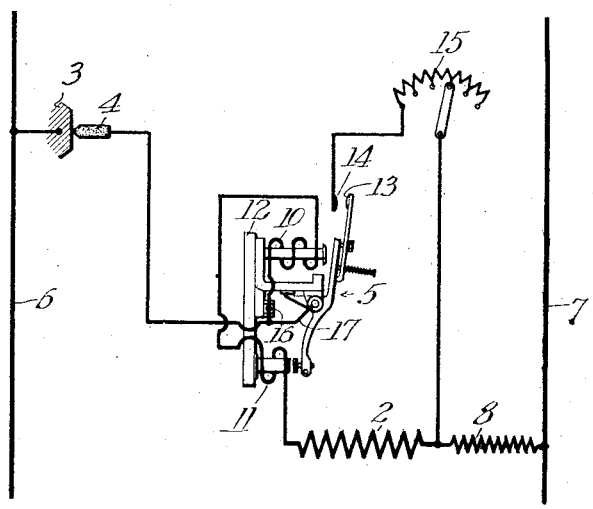
Witnesses:
Robert J. Ewen
L. C. Schantz
Inventor
Clarence T. Evans.
Edwin B. H. Tower Jr. Atty.

UNITED STATES PATENT OFFICE.

CLARENCE T. EVANS, OF MILWAUKEE, WISCONSIN, ASSIGNOR TO THE CUTLER-HAMMER MFG. CO., OF MILWAUKEE, WISCONSIN, A CORPORATION OF WISCONSIN.

WELDING-CONTROLLER.

1,215,921.

Specification of Letters Patent.

Patented Feb. 13, 1917.

Application filed May 6, 1915. Serial No. 26,269.

*To all whom it may concern:*

Be it known that I, CLARENCE T. EVANS, a citizen of the United States, residing at Milwaukee, in the county of Milwaukee and State of Wisconsin, have invented new and useful Improvements in Welding-Controllers, of which the following is a specification.

This invention relates to welding controllers.

The electric arc used in arc welding is generally obtained by completing the welding circuit by means of electrodes and subsequently separating the electrodes to draw an arc. Various controllers have been devised for limiting the flow of current in the welding circuit until the arc is established. A current limiting means is generally associated with the welding circuit and means is provided for excluding the current limiting means when the arc is established to increase the voltage across the arc to produce an arc of sufficient length and volume for welding purposes.

A co-pending application of Tower and Van Nest, Serial No. 13,608, filed March 11, 1915 describes a controller in which an automatic switch adapted to remain open when the current through its operating means is high and to close when the current decreases to a predetermined value is connected in the welding circuit to control the current limiting means.

The present invention relates more particularly to improvements in the type of controllers described in said application.

One of the objects of the invention is to provide a controller with improved means for automatically protecting the windings of its automatic switch.

Another object is to provide a controller having an improved arrangement of resistances and circuit connections.

Other objects and advantages of the invention will hereinafter appear.

The accompanying drawing illustrates an embodiment of the invention.

The controller comprises in general a current limiting means 2 connected in the circuit of the welding electrodes 3 and 4 and an automatic switch 5 responsive to the current in the welding circuit for controlling the current limiting means.

The current limiting means comprises a resistance 2 connected in series with the electrodes 3 and 4 across supply mains 6 and 7. This resistance limits the current in the circuit of the electrodes and it may be called for convenience, the starting resistance. It is excluded from the welding circuit by the automatic switch 5 as will be hereinafter described.

A second resistance 8 is provided which may be called a limiting resistance. This resistance remains in the welding circuit at all times and thereby prevents an absolute short-circuit between the supply mains in case abnormal conditions arise.

The automatic switch 5 is of a type which will hold open when the current through its operating means is high and will close when the current decreases to a predetermined value. A switch of this type is described in a co-pending application of Barnum and Date, Serial No. 800,700, filed November 13, 1913.

The switch comprises in general a movable member 9 controlled by windings 10 and 11 mounted upon an insulating base 12. The windings are connected in series and are therefore subject to the same electrical conditions. They have different pull characteristics so that when current through them is high the winding 11 holds the switch open and when the current decreases to a predetermined value the winding 10 closes the switch. The point at which the switch will close may be adjusted by adjusting the armature to vary the reluctance of the magnetic circuit. Other means of varying the relative effectiveness of the coils 10 and 11 may be employed. The switch is normally biased to open position by gravity. When the circuit through its operating windings is broken the movable member 9 automatically moves to open position and separates the switch contacts 13 and 14. It should also be understood that other switches which will hold open when current through their operating means is high and will close when the current decreases to a predetermined value may be used.

The windings 10 and 11 are connected in series with the electrodes 3 and 4 and the resistances 2 and 8. The circuit is as follows; from positive main 6, through electrodes 3 and 4, binding post 16, winding 10, winding 11, and resistances 2 and 8 to negative line 7. The windings are therefore directly responsive to the current in the welding circuit.

When the switch is closed, the windings 10 and 11 and the resistance 2 are shunted from the welding circuit through a resistance 15 which is relatively small. The welding circuit is from positive line 6 through electrodes 3 and 4, binding post 16, conductor 17, switch member 9, contacts 13, 14, resistance 15, and resistance 8 to negative line 7. The switch windings 10 and 11 and the resistance 2 are shunted. The current through them is relatively small but it is sufficient to hold the switch closed. The resistance 15 may be made adjustable so as to vary the amount of said resistance in the shunt circuit.

It will thus be seen that, when the switch is open, the windings 10 and 11 thereof are in series with the electrodes and the resistances 2 and 8, and, when the switch is closed, windings 10 and 11 of the switch and the resistance 2 are in shunt to the resistance 15.

The controller is shown in the drawing in normal position. The switch 5 is open and the resistances 2 and 8 are in series with the electrodes.

The operation is as follows:

The electrodes are brought into contact and current flows from positive line 6 through electrodes 3 and 4, windings 10 and 11, starting resistance 2 and limiting resistance 8 to the negative line 7. The switch is adjusted to hold open for the relatively high current which flows when the circuit is completed. As the electrodes are separated to strike an arc the resistance of the arc increases and the current accordingly decreases. When the current decreases to a predetermined value the switch 5 closes thereby shunting the starting resistance and allowing a heavy current to flow for welding purposes. The welding circuit may then be traced from positive line 6 through electrodes 3 and 4, binding post 16, conductor 17, switch member 9, contacts 13 and 14, resistance 15 and limiting resistance 8 to negative line 7. A sufficient current flows through the circuit including windings 10 and 11 to hold the switch closed.

The limiting resistance 8 remains in circuit to prevent an absolute short-circuit between the mains in case the electrodes are accidentally brought into contact after the arc has been struck and the switch 5 has operated.

When the weld is completed and the welding circuit broken the switch 5 automatically moves to open position and reinserts the starting resistance 2 thereby placing the controller in condition for another operation.

The controller has the advantage that the windings 10 and 11 of the switch are directly responsive to the welding current when it is relatively small. After the switch has operated and the current has increased they are in shunt to the main circuit. This enables the switch to be made sensitive. After the starting resistance has been cut out and a heavy welding current is flowing; the windings 10 and 11 are placed in shunt to a resistance of relatively small value and in addition they have the starting resistance 2 in series with them so that they are merely subjected to a current of sufficient value to hold the switch closed.

It should be understood that the embodiment shown is for the purposes of illustration only and that other structures may be devised which may embody the invention and which are included in the spirit and scope of the appended claims.

What I claim as new and desire to secure by Letters Patent of the United States is:

1. A welding controller provided with a starting circuit having a resistance therein, a welding circuit having a resistance therein, a switch having a closing winding and a holding winding connected directly in said starting circuit to hold the switch open when the initial current is high and to close it when the current decreases to a predetermined value to thereby shunt the resistance in the starting circuit and place the switch windings in shunt to the resistance in the welding circuit.

2. A welding controller provided with a starting circuit having a resistance therein, a welding circuit having a resistance therein, a switch having a closing winding and a holding winding connected directly in said starting circuit to hold the switch open when the initial current is high and to close it when the current decreases to a predetermined value to thereby shunt the resistance in the strating circuit and place it and the switch windings in shunt to the resistance in the welding circuit.

3. A welding controller having a resistance in the circuit of the electrodes, a second resistance, a switch responsive to the current in the electrode circuit having electromagnetic operating means to hold it open under certain electrical conditions and to close it under other electrical conditions to place the second resistance in the circuit of the electrodes and connect the switch operating means and the first resistance in shunt to said second resistance.

4. A welding controller having a resistance in the circuit of the electrodes, a second resistance, a switch having electromagnetic operating means connected directly in said circuit to hold the switch open under certain electrical conditions and to close it under other electrical conditions to place the second resistance in the circuit of the electrodes and connect the switch operating means and the first resistance in shunt to the second resistance.

5. A welding controller having a resistance in the circuit of the electrodes, a second resistance, a switch having electromagnetic operating means connected directly in said circuit to hold the switch open under certain electrical conditions and to close it under other electrical conditions to place the second resistance in the circuit of the electrodes and connect the switch operating means and the first resistance in shunt thereto, said switch being normally biased to open position so that the first resistance is automatically reinserted when the welding circuit is broken.

6. A welding controller having a resistance in the circuit of the electrodes, a second resistance, a switch having a closing winding and a holding winding connected directly in said circuit to hold the switch open when the welding current is high and to close it when the welding current decreases to a predetermined value to thereby shunt the first resistance and place the switch windings in shunt to the second resistance, said switch being normally biased to open position so that when the welding circuit is broken the first resistance is automatically reinserted.

7. A welding controller having a resistance in the circuit of the electrodes, a second resistance, a switch having a closing winding and a holding winding connected directly in said circuit to hold the switch open when the initial current is high and to close it when the current decreases to a predetermined value to thereby place the resistance and the switch windings in shunt to the second resistance, said switch being normally biased to open position so that when the welding circuit is broken the first resistance is automatically reinserted.

8. A welding controller having a resistance in the circuit of the electrodes, a second resistance, a lockout switch adapted to hold open until the resistance of the arc between the electrodes reaches a substantial value and thereafter to close to shunt the first resistance from the electrode circuit and connect the lockout switch windings in shunt to the second resistance.

9. A welding controller having a resistance in the circuit of the electrodes, a second resistance, a lockout switch responsive to the current in the electrode circuit adapted to hold open until the resistance of the arc between the electrodes reaches a substantial value and to thereafter close to connect the lockout switch windings and the first resistance in shunt to the second resistance and connect the second resistance in the electrode circuit.

10. A welding controller having a resistance in the circuit of the electrodes, a second resistance, a lockout switch having its windings connected directly in the electrode circuit adapted to hold open until the resistance of the arc between the electrodes reaches a substantial value and thereafter to close to shunt the first resistance from the electrode circuit and connect the lockout switch windings in shunt to the second resistance.

11. A welding controller having a starting and a limiting resistance in the circu t of the electrodes, a third resistance, a switch having a closing winding and a holding winding connected directly in said circuit to hold the switch open when the initial current is high and to close it when the current decreases to a predetermined value to thereby shunt the starting resistance and place the switch windings in the shunt to the third resistance.

12. A welding controller provided with a lockout switch having its winding in the circuit of the electrodes and adapted to remain open when the initial current is high and to close when the current decreases to a predetermined value and means controlled by the switch for increasing the current to the electrodes and decreasing the current through the switch windings when the switch closes.

In witness whereof, I have hereunto subscribed my name in the presence of two witnesses.

CLARENCE T. EVANS.

Witnesses:
L. P. COULTER,
L. C. SCHEINTZ.

Copies of this patent may be obtained for five cents each, by addressing the "Commissioner of Patents, Washington, D. C."